US012278451B2

(12) United States Patent
Hsieh

(10) Patent No.: US 12,278,451 B2
(45) Date of Patent: Apr. 15, 2025

(54) COAXIAL CABLE CONNECTOR

(71) Applicant: EZCONN CORPORATION, New Taipei (TW)

(72) Inventor: Chi Feng Hsieh, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 430 days.

(21) Appl. No.: 17/679,290

(22) Filed: Feb. 24, 2022

(65) Prior Publication Data

US 2022/0255272 A1 Aug. 11, 2022

(51) Int. Cl.
*H01R 24/40* (2011.01)
*H01R 4/20* (2006.01)
*H01R 13/502* (2006.01)
*H01R 103/00* (2006.01)

(52) U.S. Cl.
CPC ............... *H01R 24/40* (2013.01); *H01R 4/20* (2013.01); *H01R 13/502* (2013.01); *H01R 2103/00* (2013.01)

(58) Field of Classification Search
CPC .. H01R 13/502; H01R 2103/00; H01R 24/40; H01R 4/20; H01R 9/0524
See application file for complete search history.

(56) References Cited

U.S. PATENT DOCUMENTS 6,089,912 A * 7/2000 Tallis .................. H01R 24/542 439/583
7,131,868 B2 * 11/2006 Montena ............. H01R 9/0524 439/578
7,351,101 B1 * 4/2008 Montena ............. H01R 24/564 439/584
7,452,237 B1 * 11/2008 Montena ............. H01R 9/0524 439/578
9,136,654 B2 * 9/2015 Matzen ............... H01R 9/0524
9,306,324 B2 * 4/2016 Wei ..................... H01R 9/0524
9,859,669 B2 * 1/2018 Chen .................... H01R 24/40
10,418,760 B2 * 9/2019 Watkins ............... H01R 13/582
10,431,942 B2 * 10/2019 Watkins ............... H01R 9/0527
10,777,915 B1 * 9/2020 Youtsey ............... H01R 9/0524
11,217,948 B2 * 1/2022 Watkins ............... H01R 9/0527
2006/0172571 A1 * 8/2006 Montena ............. H01R 9/0524 439/91

(Continued)

FOREIGN PATENT DOCUMENTS

CN 110073551 A * 7/2019 ......... H01R 13/5825

*Primary Examiner* — Marcus E Harcum
(74) *Attorney, Agent, or Firm* — Rankin, Hill & Clark LLP

(57) ABSTRACT

A coaxial cable connector includes an inner sleeve, a nut, a first outer sleeve and a coupling sleeve. The first outer sleeve is coaxially arranged outside the inner sleeve. An inner wall of the first outer sleeve and the inner sleeve cooperate to define a first space. The nut is arranged outside the inner sleeve. The coupling sleeve is coaxially arranged inside the first outer sleeve. The coupling sleeve has a first end portion and a second end portion, wherein the first end portion of the coupling sleeve moves into the first space and resists against the inner sleeve as the coupling sleeve moves axially toward the nut so that one end of the inner sleeve radially deformed to press a metal layer of the coaxial cable, wherein the second end portion of the coupling sleeve is deformed radially to press an outer jacket of the coaxial cable.

21 Claims, 8 Drawing Sheets

(56) References Cited

U.S. PATENT DOCUMENTS

| | | | | |
|---|---|---|---|---|
| 2006/0194474 | A1* | 8/2006 | Montena | H01R 9/0518 439/578 |
| 2013/0130544 | A1* | 5/2013 | Wei | H01R 9/05 439/584 |
| 2018/0301844 | A1* | 10/2018 | Huang | H01R 9/0521 |
| 2021/0210875 | A1* | 7/2021 | Eriksen | H01R 24/40 |

* cited by examiner

COAXIAL CABLE CONNECTOR

RELATED APPLICATIONS

This application claims priority to TW Application Ser. No. 110201653, filed on Feb. 9, 2021, which is incorporated herein by reference in its entirety.

TECHNICAL FIELD

The present invention is related to a connector used in the field of data transmission technology, especially, related to a coaxial cable connector.

BACKGROUND

By aligning and coupling the metal center pin/cable conductor in the coaxial cable connector with the center hole of the plug connector, the coaxial cable connector and the plug connector are connected via the cable to reliably and accurately transmit data, video, and voice communications. To make the connector have good "signal transmission stability", many technologies in the past have improved the electrical connectivity with the existing connector, especially the cable TV signal is connected to the receiving TV through the coaxial cable. This coaxial cable connects to the cable TV decoders, cassette recorders/digital video discs (VCR/DVD) hard disk digital recorders, satellite receivers, video games, TV signal distribution splitters, and switch connections via the screw-on F-Type connectors.

In general, coaxial cables mostly use single-core bare copper wire, multi-core copper stranded wire, copper-clad steel wire or tinned copper wire as the conductor of the center conductor, and there are multiple layers of ring-shaped materials from the inside to the outside around the center conductor. The center conductor is covered with an insulation layer, the insulation layer can be made of transparent polyethylene, foamed polyethylene, solid polyester material, and other materials. The insulation layer is covered with a copper braid shield layer, and the braid layer is mostly made of metal wires such as copper wire or aluminum wire. The braid layer is covered with a jacket, which is made of polyethylene, polyvinyl chloride, NC-PVC, LSFH, and other plastic materials. The coaxial cable is made through the above-mentioned layer-by-layer structure, and its cross-section is concentric. This structure has a shielding effect on electromagnetic signal transmission, making it less susceptible to external noise interference, and is often used to transmit video, audio, and the Internet.

In practical applications, there are many problems with coaxial cable connectors that need to be improved, for example, the external force, such as pulling force, applied to the coaxial cable may cause the coaxial cable detach from the coaxial cable connector so that the signal transmission becomes unstable. Hence, the present invention provides a coaxial cable connector for the satisfactory products to solve the problems of prior art.

SUMMARY

The purpose of the present invention is to provide a coaxial cable connector that can solve at least one of the disadvantages.

The purpose of the present invention is to provide a coaxial cable connector that can improve the stability of the configuration of the coaxial cable connector itself, especially, stability of the contact of the inner sleeve and the coaxial cable.

The present invention provides a coaxial cable connector. The coaxial cable connector is suitable for fixing a coaxial cable. The coaxial cable connector includes an inner sleeve, a first outer sleeve, a nut, a second outer sleeve and a coupling sleeve. The inner sleeve has a plurality of first elastic wings on one end thereof. The first outer sleeve is coaxially arranged outside the inner sleeve. An inner wall of the first outer sleeve and the plurality of first elastic wings cooperate to define a first space. The nut is arranged outside the inner sleeve. The second outer sleeve is coaxially arranged outside the first outer sleeve. The coupling sleeve is coaxially arranged inside the first outer sleeve and the second outer sleeve. The coupling sleeve has a first end portion and a second end portion, the first end portion is disposed inside the first outer sleeve, and the second end portion is disposed inside the second outer sleeve, wherein the first end portion of the coupling sleeve moves into the first space and resists against the first elastic wing as the second outer sleeve moves axially toward the nut so that the first elastic wing radially deformed to press a metal layer of the coaxial cable, wherein the second end portion of the coupling sleeve is deformed radially to press an outer jacket of the coaxial cable.

In some embodiments, the coupling sleeve further has an inner notch, the inner notch has a flat plane formed on an inner peripheral surface of the second end portion thereof, the flat plane of the inner groove deforms to generate a pointed portion that presses the outer jacket of the coaxial cable after the second end of the coupling sleeve is deformed in the radial direction.

In some embodiments, the angle between the plurality of first elastic wings and the axis line after radial deformation is ranging from 3 degrees to 10 degrees, 5 degrees to 15 degrees, or 5 degrees to 30 degrees.

In some embodiments, the coupling sleeve further has a second connecting portion, the second connecting portion is located at the first end portion and opens in a Y-shape, and the opening direction faces the inner sleeve.

In some embodiments, the width of the second connecting portion is ranging from 0.32 cm to 0.38 cm, 0.2 cm to 0.5 cm, or 0.3 cm to 0.8 cm.

In some embodiments, the second connecting portion has a first baffle and a second baffle, and the angle between the first baffle and the second baffle is ranging from 5 degrees to 15 degrees, 5 degrees to 20 degrees, 10 degrees to 30 degrees, or 15 degrees to 45 degrees.

In some embodiments, the second baffle of the second connecting portion of the coupling sleeve is composed of a plurality of second elastic wings, and a gap between every two second elastic wings.

In some embodiments, the second baffle of the connecting portion of the coupling sleeve is bent away from the first baffle as the second outer sleeve moves axially toward the nut.

In some embodiments, the material of the coupling sleeve includes polymer.

In some embodiments, each of the first elastic wings of the inner sleeve has a tip portion facing the coupling sleeve.

The present invention also provides a coaxial cable connector. The coaxial cable connector is suitable for fixing a coaxial cable. The coaxial cable connector includes an inner sleeve, a first outer sleeve coaxially arranged outside the inner sleeve, a nut arranged outside the inner sleeve, and a first space formed between an inner wall of the first outer sleeve and the inner sleeve. It is characterized in that the coaxial cable connector further includes a coupling sleeve coaxially arranged inside the first outer sleeve. The coupling sleeve has a first end portion and a second end portion, wherein the first end portion of the coupling sleeve moves into the first space and resists against the inner sleeve as the coupling sleeve moves axially toward the nut so that one end of the inner sleeve radially deformed to press a metal layer of the coaxial cable, wherein the second end portion of the coupling sleeve is deformed radially to press an outer jacket of the coaxial cable.

In some embodiments, the second baffle of the connecting portion of the coupling sleeve is bent away from the first baffle as the coupling sleeve moves axially toward the nut.

In some embodiments, the coaxial cable connector further includes a rubber ring, wherein the nut includes a groove formed an inner peripheral surface thereof, a front end of the inner sleeve and the groove cooperate to define a accommodating space, the rubber ring is deposited in the accommodating space.

In some embodiments, one end of the inner sleeve has a flange, the flange has a tip portion facing the coupling sleeve.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
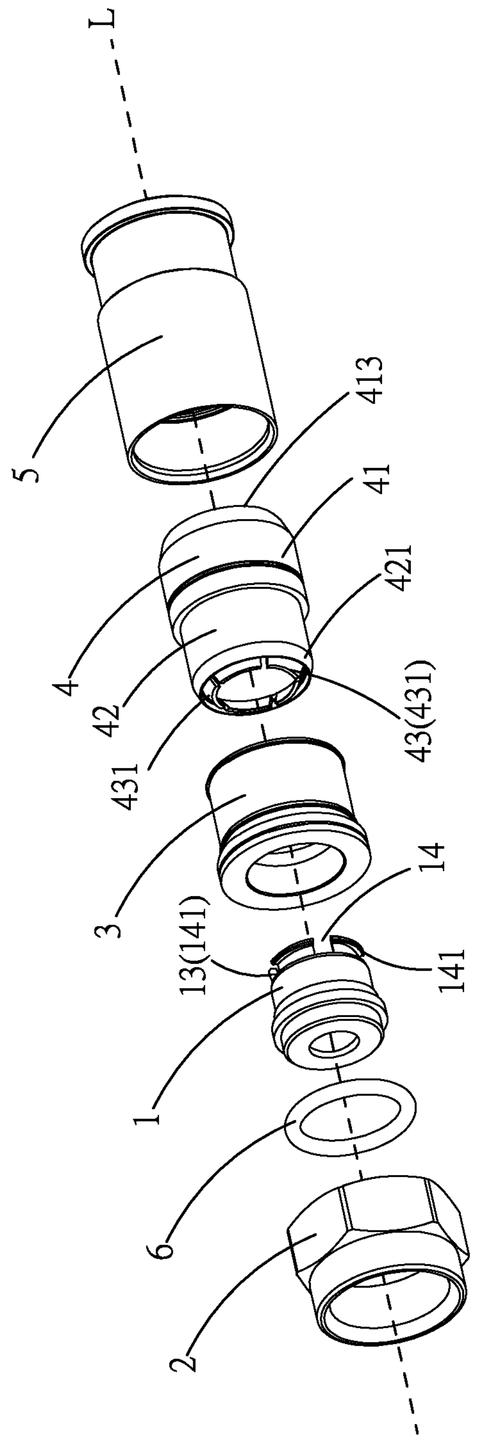
FIG. 1 illustrates a three-dimensional exploded view of an embodiment of a coaxial cable connector of the present invention.
Figure 2:
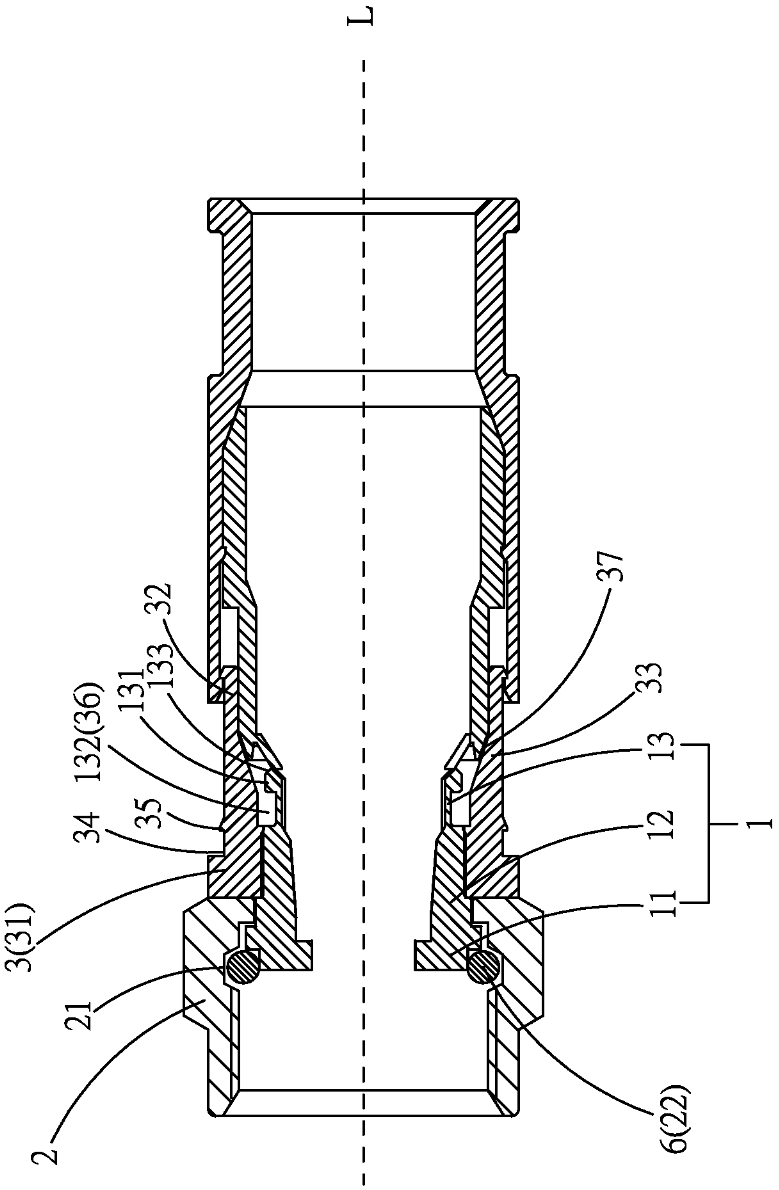
FIG. 2 illustrates a cross-sectional view of the embodiment before assembly.
Figure 3:
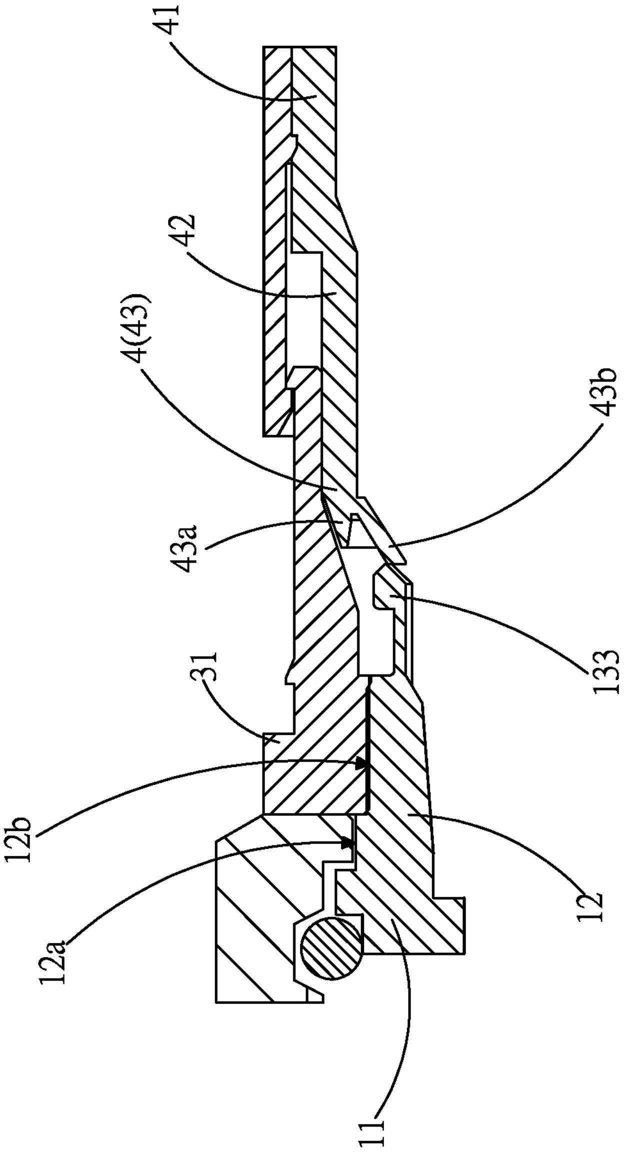
FIG. 3 illustrates a partial enlarged view of the embodiment, a second connecting portion of a coupling sleeve is opened in a Y shape.
Figure 4:
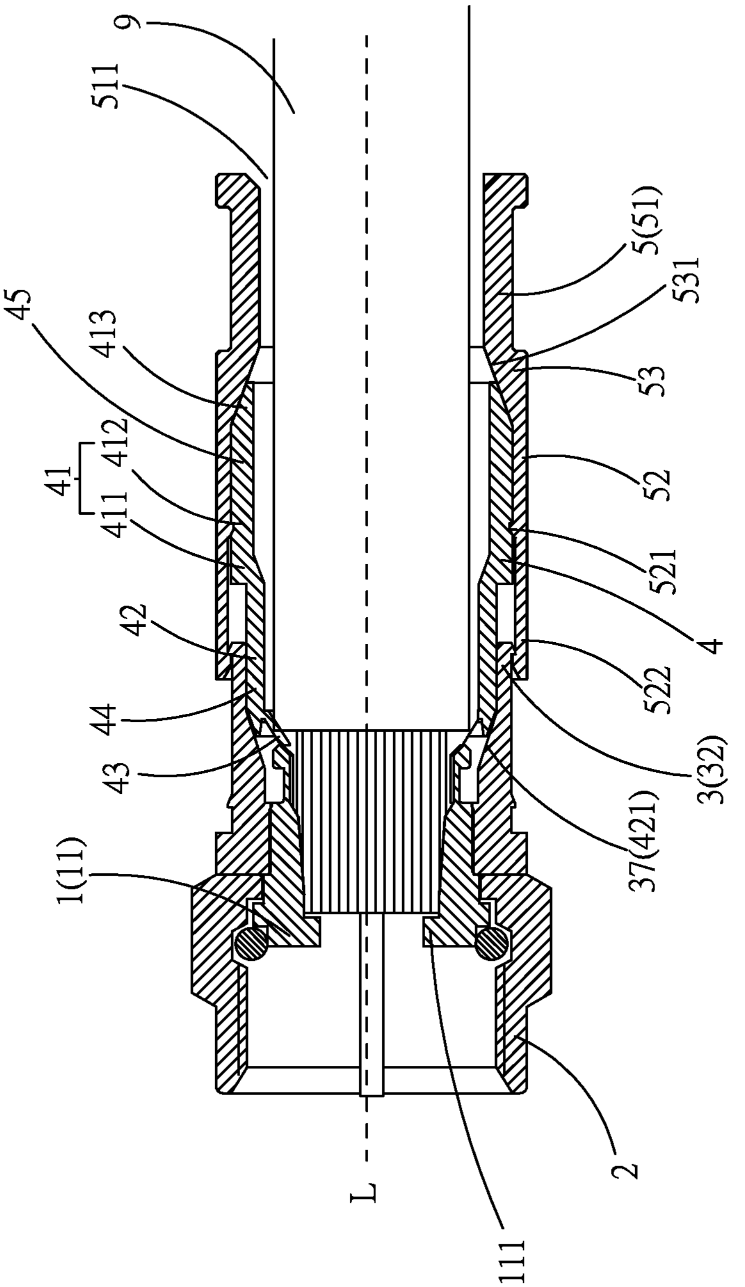
FIG. 4 is a view similar to FIG. 2, a coaxial cable is installed inside the embodiment.

FIG. 1 illustrates a three-dimensional exploded view of an embodiment of a coaxial cable connector of the present invention. FIG. 2 illustrates a cross-sectional view of the embodiment before assembly. FIG. 3 illustrates a partial enlarged view of the embodiment, a second connecting portion of a coupling sleeve is opened in a Y shape. FIG. 4 is a view similar to FIG. 2, a coaxial cable is installed inside the embodiment.

Referring to FIGS. 1 to 4, an embodiment of coaxial cable connector of the present invention is illustrated. In this embodiment, the coaxial cable connector is suitable for fixing a coaxial cable 9. The coaxial cable connector comprises an inner sleeve 1, a nut 2, a first outer sleeve 3, a coupling sleeve 4, a second outer sleeve 5, and a rubber ring 6.

The inner sleeve 1 surrounds an axial line L. The inner sleeve 1 includes a first head portion 11, a first body portion 12 and a first connecting portion 13 arranged in sequence. The first connecting portion 13 has a flange 131 protruding outward, and a ring notch 132 adjacent to the flange 131. Preferably, the flange 131 has a tip portion 133 facing the coupling sleeve 4, wherein the material of the coupling sleeve 4 is polymer, such as plastic. The material of the inner sleeve 1, the nut 2, the first outer sleeve 3 and the second outer sleeve 5 can be one of metal materials such as copper, iron, silver, nickel, gold, copper-gold alloy, copper-tin alloy, copper-nickel alloy, or a combination.

In this embodiment, the first head portion 11 of the inner sleeve 1 and an outer peripheral surface of the first body portion 12 are connected in a stepped manner. The outer peripheral surface of the first body portion 12 includes a first outer circumferential surface 12*a* and a second outer circumferential surface 12*b*. The inner sleeve 1 also includes a plurality of opening slots 14 formed in the first connecting portion 13. The plurality of opening slots 14 divide the first connecting portion 13 into a plurality of first elastic wings 141, the plurality of first elastic wings 141 have elasticity and flexible. The inner sleeve 1 and the plurality of first elastic wings 141 are integrated.

The nut 2 is sleeved on the first head portion 11 of the inner sleeve 1, and the inner flange of the nut 2 can rotate freely on the first outer circumferential surface 12*a* of the first body portion 12 of the inner sleeve 1. The nut 2 includes a groove 21 formed on the inner peripheral surface thereof, and the groove 21 cooperates with the first head portion 11 of the inner sleeve 1 to define an accommodating space 22.

The first outer sleeve 3 includes a first ring wall 31, a first extension wall 32, a first connecting wall 33, a locating slot 34 and a guiding block 35. The first ring wall 31 is sleeved on the second outer circumferential surface 12*b* of the first body portion 12 of the inner sleeve 1 and tightly fitted and fixedly connected to the second outer circumferent surface 12*b*. The first ring wall 31 and the ring notch 132 of the inner sleeve 1 cooperate to define a first space 36. The first connecting wall 33 is located between the first ring wall 31 and the first extension wall 32. The connecting wall 33 has an inclined surface 37 facing the axial line L. The angle between the inclined surface 37 and the axial line L is ranging from 1 degree to 5 degrees, 2 degrees to 10 degrees, or 2 degrees to 6 degrees. The locating slot 34 is formed on the outer peripheral surface of the first ring wall 31. The guiding block 35 is adjacent to the locating slot 34 and disposed on the first ring wall 31.

The coupling sleeve 4 surrounds the axial line L. The coupling sleeve 4 includes a second head portion 41, a second body portion 42 and a second connecting portion 43. The second connecting portion 43 is slightly Y-shaped in cross section (as shown in FIG. 3), and has a first baffle 43*a* and a second baffle 43*b*. The angle between the first baffle 43*a* and the second baffle is ranging from 5 degrees to 15 degrees, 5 degrees to 20 degrees, 10 degrees to 30 degrees, or 15 degrees to 45 degrees. The second head portion 41 has a fixed section 411 and a flexible section 412, wherein the fixed section 411 and the second body portion 42 are stepped, that is, the fixed section 411 has a protrusion portion protruding from the outer surface of the second body portion 42. The flexible section 412 has a first arc surface 413. The second connecting portion 43 also has a second arc surface 421 that matches with the inclined surface 37. The second baffle 43*b* of the second connecting portion 43 extends from the inner peripheral surface of the second body portion 42 and away from the second head portion 41 and gradually approaches the axial line L, thereby being arranged at an angle with the second body portion 42. Preferably, the width of the second connecting portion 43 is ranging from 0.32 cm to 0.38 cm, 0.2 cm to 0.5 cm, or 0.3 cm to 0.8 cm. In this embodiment, the second baffle 43*b* of the second connecting portion 43 is composed of a plurality of second elastic wings 431. A gap is formed between every two second elastic wings 431.

The second outer sleeve 5 includes a second ring wall 51, a second extension wall 52, and a second connecting wall 53. The second ring wall 51 defines an installation opening 511 for the coaxial cable 9 to enter. The second extension wall 52 has an embedded portion 521 and a tail portion 522, the embedded portion 521 is coupled to the second head portion 41 of the coupling sleeve 4, and the tail portion 522 abuts against the first extension wall 32 of the first outer sleeve 3. The second connecting wall 53 is located between the second ring wall 51 and the second extension wall 52, and the second connecting wall 53 has a connecting bevel 531 facing the axial line L. The angle between the connecting bevel 531 and the axial line L is ranging from 1 degree to 5 degrees, 2 degrees to 10 degrees, or 2 degrees to 6 degrees. The connecting bevel 531 and the first arc surface 413 of the flexible section 412 of the coupling sleeve 4 are matched in shape.

Figure 5:
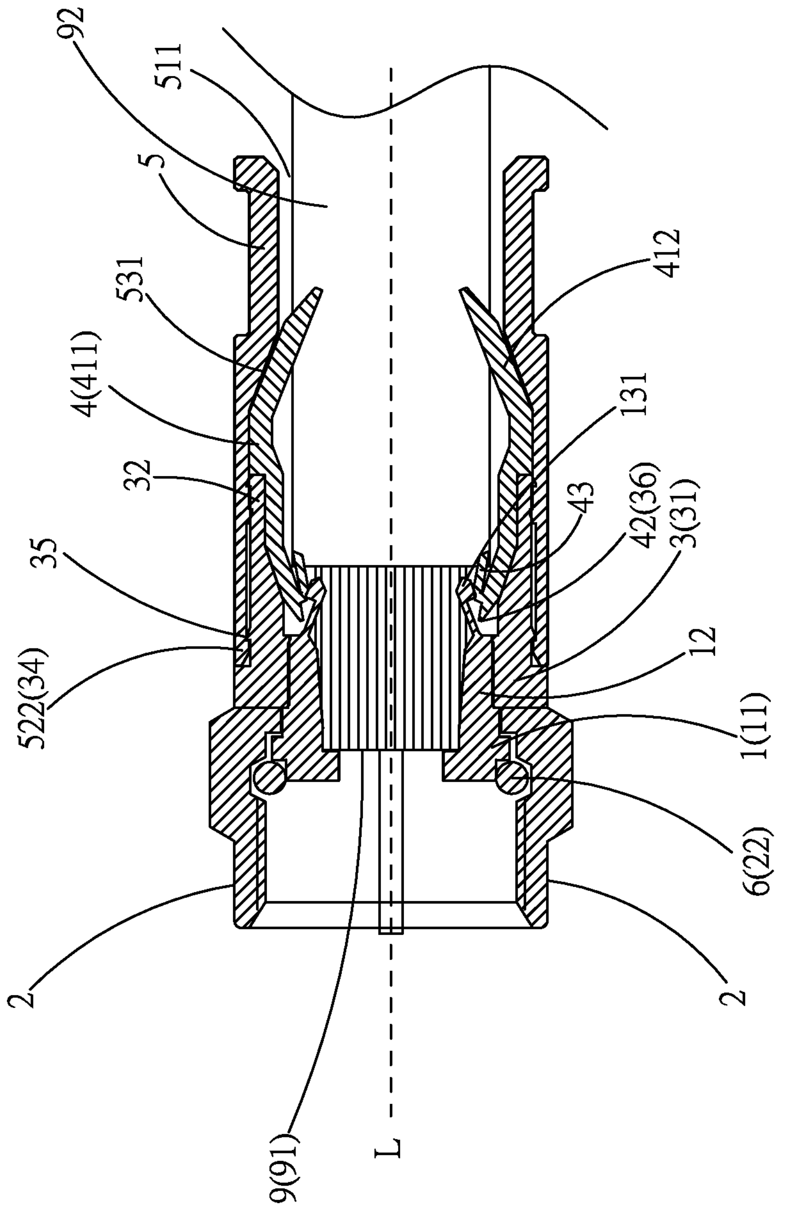
FIG. 5 illustrates a cross-sectional view of the embodiment after assembly.
Figure 6:
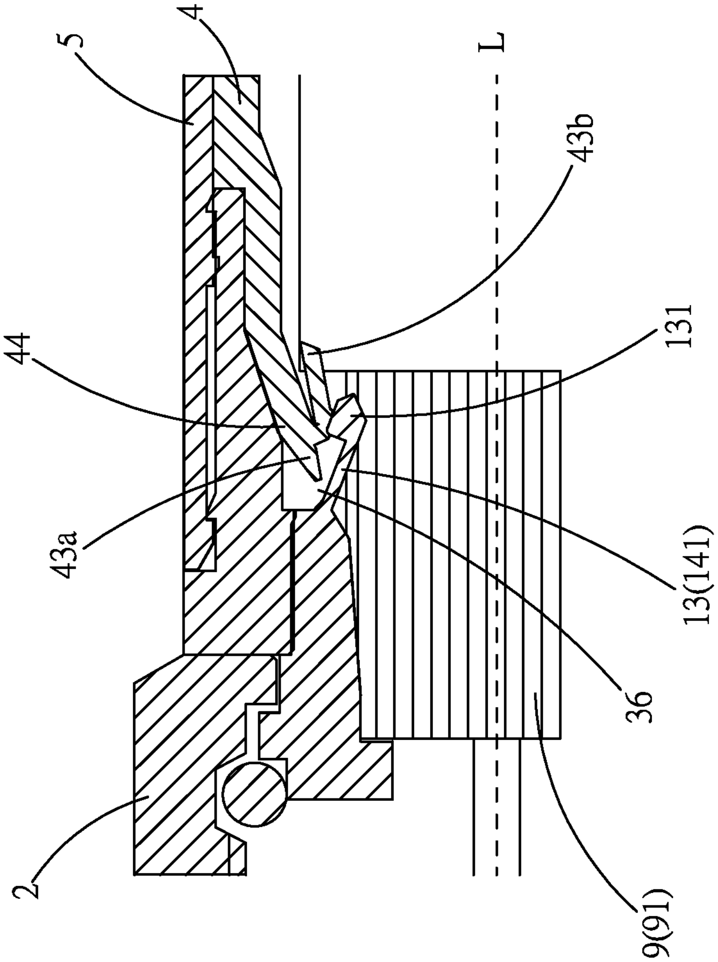
FIG. 6 illustrates a partial enlarged view of the embodiment after assembly, a second baffle of the coupling sleeve is bent away from a first baffle.

FIG. 1 illustrates a three-dimensional exploded view of an embodiment of a coaxial cable connector of the present invention. FIG. 4 is a view similar to FIG. 2, a coaxial cable is installed inside the embodiment. FIG. 5 illustrates a cross-sectional view of the embodiment after assembly. FIG. 6 illustrates a partial enlarged view of the embodiment after assembly, a second baffle of the coupling sleeve is bent away from a first baffle. Referring to FIGS. 1, 4 to 6, The assembling sequence of the coaxial cable 9 and the coaxial cable connector of the present invention can be to assemble the left half of the components first: put the rubber ring 6 on the first head portion 11 of the inner sleeve 1, insert the inner sleeve 1 into the nut 2 so that the rubber ring 6 is located in the accommodating space 22, and sleeve the first ring wall 31 of the first outer sleeve 3 on the first body portion 12 of the inner sleeve 1. Next, assemble the right half of the components, insert the coupling sleeve 4 inside the second outer sleeve 5, the second body portion 42 of the coupling sleeve 4 and the second connecting wall 52 of the second outer sleeve 5 cooperate to clamp the first extension wall 32 of the first outer sleeve 3. Then, insert the coaxial cable 9 into the second outer sleeve 5 from the installation opening 511 and move the coaxial cable 9 toward the nut 2 until the coaxial cable 9 abuts against the stop block 111 of the first head portion 11 of the inner sleeve 1. In this embodiment, a first end portion 44 of the coupling sleeve 4 is located inside the first outer sleeve 3, and a second end portion 45 of the outer sleeve 4 is located inside the second outer sleeve 5.

The second baffle 43*a* of the second connecting portion 43 of the coupling sleeve 4 moves axially into the first space 36 along the inclined surface 37 as the second outer sleeve 5 press the coupling sleeve 4 to move axially toward the nut sleeve 2, and the first baffle 43*a* abuts against the surface of the first elastic wing 141 of the first connecting portion 13. The Y-shaped portion defined by the first baffle 43*a* and the second baffle 43*b* resists against the flange 131 of the inner sleeve 1. As the second outer sleeve 5 pushes the coupling sleeve 4 to move axially, the first baffle 43*a* of the second connecting portion 43 presses the first elastic wing 141 of the first connecting portion 13 to deform radially, so that the first elastic wing 141 abuts and compresses the metal layer 91 of the coaxial cable 9, wherein the angle between the first elastic wing 141 after radial deformation and the axial line L is ranging from 3 degrees to 10 degrees, 5 degrees to 15 degrees, or 5 degrees to 30 degrees, moreover, the second baffle 43*b* of the second connecting portion 43 gradually is folded away from the first baffle 43*a*, and further presses the flange 131 of the inner sleeve 1, so that the radial deformation angle of the first elastic wing 141 is increased and the flange 131 approaches the axial line L more. Further, after the protrusion portion of the fixed section 411 of the coupling sleeve 4 abuts against the end of the first extension wall 32 of the first outer sleeve 3, move the second outer sleeve 5 toward the nut sleeve 2 continuously, the flexible section 412 of the coupling sleeve 4 start to deform radially due to the pressing force of the connecting bevel 531 of the second outer sleeve 5, thereby pressing the outer jacket 92 of the coaxial cable 9 tightly. It is noted that while the inclination angle of the connecting bevel 531 becomes steeper, the degree of radial deformation of the flexible section 412 of the coupling sleeve 4 is greater, therefore, the pressing force of the flexible section 412 on the coaxial cable 9 can be increased. The coaxial cable connector with better grounding and electrical connection is obtained by deforming the second baffle 43*b* of the second connecting portion 43. Since the flexible section 412 of the second head portion 41 is deformed, the coaxial cable connector and the coaxial cable 9 can have higher connection strength with each other.

Finally, push the second outer sleeve 5 against the coupling sleeve 4 continuously until the tail portion 522 of the second outer sleeve 5 passes through the guiding block 35 and is locked in the locating slot 34, and the first end portion 44 of the coupling sleeve 4 is in the first space 36, then, the assembling operation of the present invention is completed, as shown in FIG. 5.

After the assembly, the present invention the second connecting portion 43 of the coupling sleeve 4 is folded to increase the wall thickness so that the first connecting portion 13 of the inner sleeve 1 is pressed closer to the coaxial cable 9, and the flexible section 412 of the coupling sleeve 4 also presses against the coaxial cable 9. This double-sided compression design of the coaxial cable 9 enables the coaxial cable 9 to be more fixed with the coaxial cable connector of the present invention, that is, the coaxial cable 9 hardly loose from the coaxial cable connector.

Figure 7:
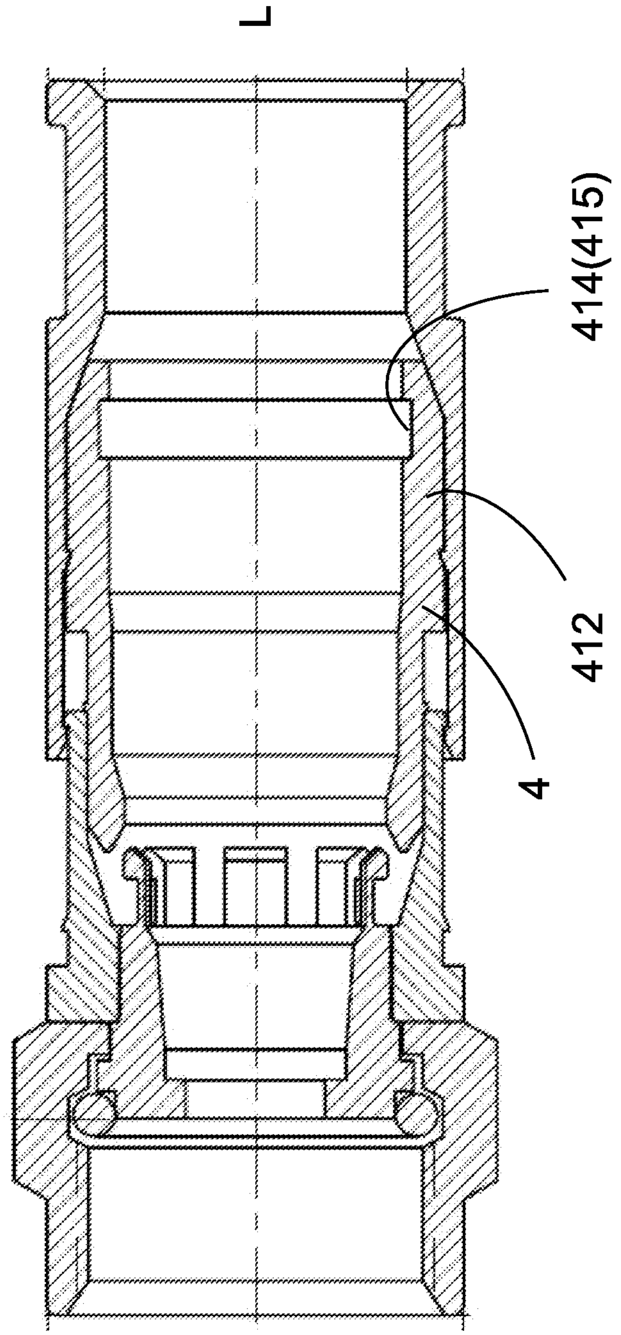
FIG. 7 is a view similar to FIG. 2 and illustrates an alternative coupling sleeve of the embodiment.
Figure 8:
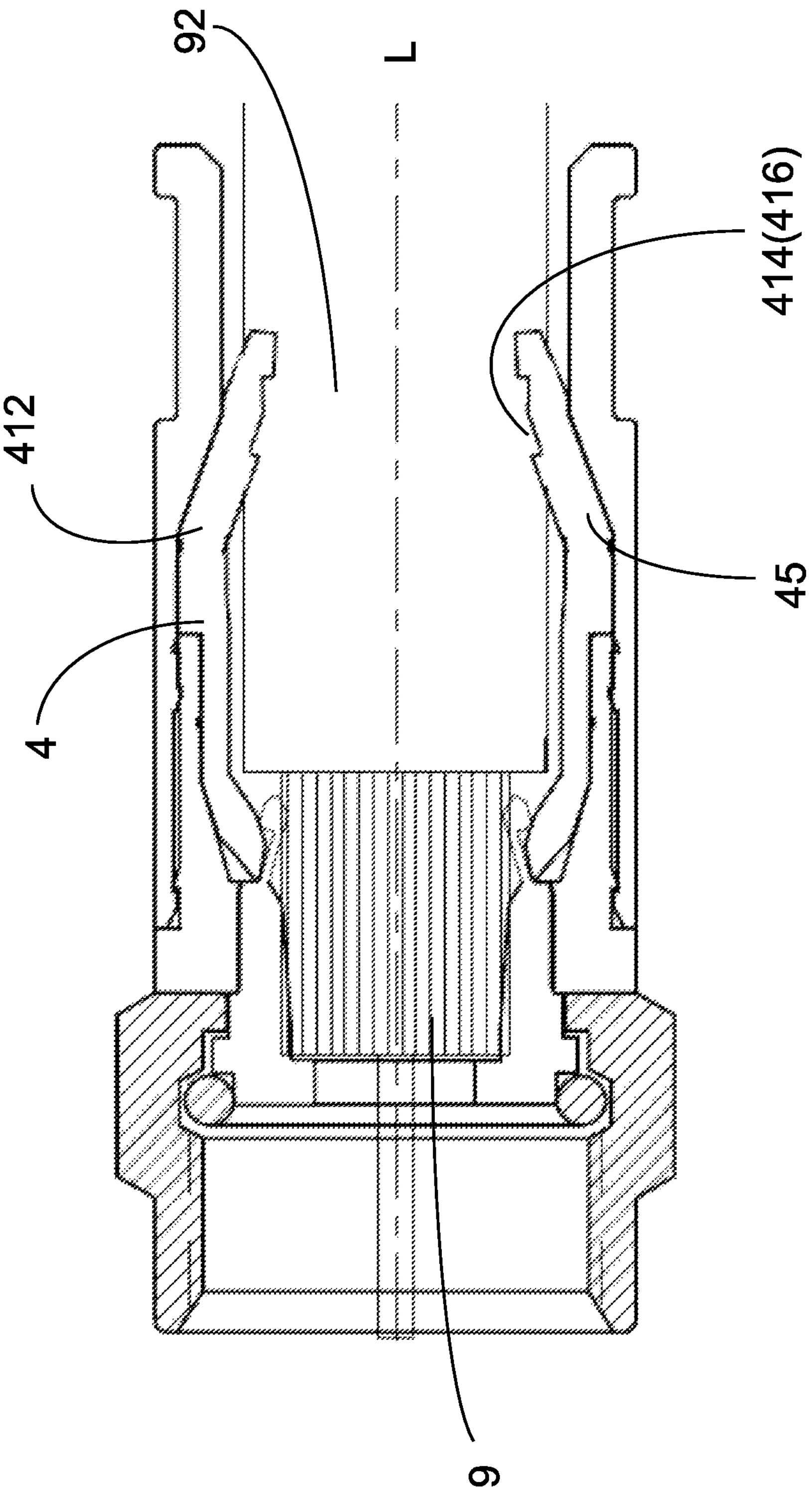
FIG. 8 is a view similar to FIG. 5, illustrates the alternative coupling sleeve of the embodiment after being combined with a coaxial cable.

FIG. 7 is a view similar to FIG. 2 and illustrates an alternative coupling sleeve of the embodiment. FIG. 8 is a view similar to FIG. 5, illustrates the alternative coupling sleeve of the embodiment after being combined with a coaxial cable. Referring to FIGS. 7 to 8, The coupling sleeve 4 of the coaxial cable connector of the present invention can be designed with an inner notch 414 located on the inner peripheral surface of the flexible section 412, the inner notch 414 has a flat plane 415 facing the axial line L. While the coaxial cable connector and the coaxial cable 9 are assembled, the second end portion 45 of the coupling sleeve 4 is deformed radially. The flat plane 415 of the inner notch 414 is deformed to generate a pointed portion 416, which is further tightly engaged the outer jacket 92 of the coaxial cable 9 (as shown in FIG. 8). Hence, the coaxial cable 9 is not easily pulled out of the coaxial cable connector of the present invention.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A coaxial cable connector, suitable for fixing a coaxial cable, the coaxial cable connector including:

an inner sleeve, having a plurality of first elastic wings on one end thereof;

a first outer sleeve, coaxially arranged outside the inner sleeve, wherein an inner wall of the first outer sleeve and the plurality of first elastic wings cooperate to define a first space;

a nut, arranged outside the inner sleeve;

a second outer sleeve, coaxially arranged outside the first outer sleeve; and a coupling sleeve, coaxially arranged inside the first outer sleeve and the second outer sleeve, the coupling sleeve having a first end portion and a second end portion, the first end portion disposed inside the first outer sleeve, and the second end portion disposed inside the second outer sleeve, wherein the first end portion of the coupling sleeve moves into the first space and resists against the first elastic wing as the second outer sleeve moves axially toward the nut so that the first elastic wing radially deformed to press a metal layer of the coaxial cable, wherein the second end portion of the coupling sleeve is deformed radially to press an outer jacket of the coaxial cable, and wherein the coupling sleeve includes a connecting portion at the first end portion, the connecting portion configured to enhance pressing of the first elastic wings against the metal layer of the coaxial cable as the second outer sleeve moves axially toward the nut.

2. The coaxial cable connector of claim 1, wherein the coupling sleeve further has an inner notch, the inner notch has a flat plane formed on an inner peripheral surface of the second end portion thereof, the flat plane of the inner notch deforms to generate a pointed portion that presses the outer jacket of the coaxial cable after the second end of the coupling sleeve is deformed in the radial direction.

3. The coaxial cable connector of claim 1, wherein an angle between the plurality of first elastic wings and an axis line after radial deformation is ranging from 3 degrees to 10 degrees, 5 degrees to 15 degrees, or 5 degrees to 30 degrees.

4. The coaxial cable connector of claim 1, wherein the connecting portion of the coupling sleeve is located at the first end portion and opens in a Y-shape, and an opening direction faces the inner sleeve.

5. The coaxial cable connector of claim 4, wherein a width of the second connecting portion is ranging from 0.32 cm to 0.38 cm, 0.2 cm to 0.5 cm, or 0.3 cm to 0.8 cm.

6. The coaxial cable connector of claim 4, wherein the second connecting portion has a first baffle and a second baffle, and an angle between the first baffle and the second baffle is ranging from 5 degrees to 15 degrees, 5 degrees to 20 degrees, 10 degrees to 30 degrees, or 15 degrees to 45 degrees.

7. The coaxial cable connector of claim 6, wherein the second baffle of the second connecting portion of the coupling sleeve is composed of a plurality of second elastic wings, and a gap between every two second elastic wings.

8. The coaxial cable connector of claim 6, wherein the second baffle of the connecting portion of the coupling sleeve is bent away from the first baffle as the second outer sleeve moves axially toward the nut.

9. The coaxial cable connector of claim 1, wherein the material of the coupling sleeve includes polymer.

10. The coaxial cable connector of claim 1, wherein each of the first elastic wings of the inner sleeve has a tip portion facing the coupling sleeve.

11. A coaxial cable connector, suitable for fixing a coaxial cable, the coaxial cable connector including an inner sleeve, a first outer sleeve coaxially arranged outside the inner sleeve, a nut arranged outside the inner sleeve, and a first space formed between an inner wall of the first outer sleeve and the inner sleeve, characterized in that:

the coaxial cable connector further including a coupling sleeve coaxially arranged inside the first outer sleeve, the coupling sleeve has a first end portion and a second end portion, wherein the first end portion of the coupling sleeve moves into the first space and resists against the inner sleeve as the coupling sleeve moves axially toward the nut so that one end of the inner sleeve radially deformed to press a metal layer of the coaxial cable, wherein the second end portion of the coupling sleeve is deformed radially to press an outer jacket of the coaxial cable, and wherein the second end portion of the coupling sleeve includes a deformable section configured to generate an increased gripping force of the outer jacket of the coaxial cable when the coupling sleeve is moved axially toward the nut.

12. The coaxial cable connector of claim 11, wherein the coupling sleeve further has an inner notch, the inner notch has a flat plane formed on an inner peripheral surface of the second end portion thereof, the flat plane of the inner notch deforms to generate a pointed portion that presses the outer jacket of the coaxial cable after the second end of the coupling sleeve is deformed in the radial direction.

13. The coaxial cable connector of claim 11, wherein the coupling sleeve further includes a connecting portion at the first end portion, the connecting portion opens in a Y-shape, and an opening direction faces the inner sleeve.

14. The coaxial cable connector of claim 13, wherein a width of the second connecting portion is ranging from 0.32 cm to 0.38 cm, 0.2 cm to 0.5 cm, or 0.3 cm to 0.8 cm.

15. The coaxial cable connector of claim 13, wherein the second connecting portion has a first baffle and a second baffle, and an angle between the first baffle and the second baffle is ranging from 5 degrees to 15 degrees, 5 degrees to 20 degrees, 10 degrees to 30 degrees, or 15 degrees to 45 degrees.

16. The coaxial cable connector of claim 15, wherein the second baffle of the second connecting portion of the coupling sleeve is composed of a plurality of second elastic wings, and a gap between every two second elastic wings.

17. The coaxial cable connector of claim 15, wherein the second baffle of the connecting portion of the coupling sleeve is bent away from the first baffle as the coupling sleeve moves axially toward the nut.

18. The coaxial cable connector of claim 11, wherein the material of the coupling sleeve includes polymer.

19. The coaxial cable connector of claim 11, further including a rubber ring, wherein the nut includes a groove formed an inner peripheral surface thereof, a front end of the inner sleeve and the groove cooperate to define a accommodating space, the rubber ring is deposited in the accommodating space.

20. The coaxial cable connector of claim 11, wherein one end of the inner sleeve has a flange, the flange has a tip portion facing the coupling sleeve.

21. The coaxial cable connector of claim 11, wherein the deformable section of the coupling sleeve is located at the second end portion and includes a flexible section that radially deforms to press against the outer jacket of the coaxial cable.

* * * * *